(12) United States Patent
Bang

(10) Patent No.: US 9,308,679 B2
(45) Date of Patent: Apr. 12, 2016

(54) APPARATUS FOR MANUFACTURING HYBRID STABILIZER LINK

(75) Inventor: Sung Ho Bang, Changwon-si (KR)

(73) Assignee: Central Corporation, Gyeongsangnam-Do (KR)

( * ) Notice: Subject to any disclaimer, the term of this patent is extended or adjusted under 35 U.S.C. 154(b) by 206 days.

(21) Appl. No.: 14/232,877

(22) PCT Filed: Jul. 14, 2011

(86) PCT No.: PCT/KR2011/005184
§ 371 (c)(1),
(2), (4) Date: Mar. 17, 2014

(87) PCT Pub. No.: WO2013/008970
PCT Pub. Date: Jan. 17, 2013

(65) Prior Publication Data
US 2014/0193535 A1   Jul. 10, 2014

(51) Int. Cl.
*B29C 45/14* (2006.01)
*B29C 45/37* (2006.01)

(52) U.S. Cl.
CPC ............ *B29C 45/14* (2013.01); *B29C 45/14426* (2013.01); *B29C 45/376* (2013.01)

(58) Field of Classification Search
CPC .................................................. B29C 45/376
USPC ........................................ 403/135; 425/129.1
See application file for complete search history.

(56) References Cited

FOREIGN PATENT DOCUMENTS

| JP | H 3-92419 A | | 4/1991 | |
|---|---|---|---|---|
| JP | 2005-119005 | * | 5/2005 | ............. B29C 45/14 |
| JP | 2005-119005 A | | 5/2005 | |
| JP | 4270444 B2 | | 3/2009 | |
| KR | 20-0172835 Y1 | | 3/2000 | |
| KR | 2001-0028261 A | | 4/2001 | |
| KR | 10-2010-0010383 A | | 2/2010 | |
| KR | 10-2010-0112846 A | | 10/2010 | |

OTHER PUBLICATIONS

International Search Report mailed Mar. 2, 2012, issued in corresponding International Application No. PCT/KR2011/005184.

* cited by examiner

*Primary Examiner* — Yogendra Gupta
*Assistant Examiner* — Kimberly A Stewart
(74) *Attorney, Agent, or Firm* — Stein IP, LLC

(57) ABSTRACT

Provided is an apparatus for manufacturing a hybrid stabilizer link. The apparatus includes a die that injects a resin to mold a socket into which a ball stud is inserted, a shaft whose first end is inserted into the die and which has the socket formed at the inserted first end thereof, and a control unit that fixes a pre-molded socket to the second end of the shaft, adjusts a rotational angle of the shaft based on a lengthwise axis of the shaft, and adjusts a distance from the die. After the socket is injection-molded on the first end of the metal shaft having a predetermined length, when another socket is injection-molded on the second end of the shaft, an angle of the previously molded and a distance from the die are easily adjusted.

4 Claims, 3 Drawing Sheets

APPARATUS FOR MANUFACTURING HYBRID STABILIZER LINK

CROSS-REFERENCE TO RELATED APPLICATIONS

This application is a national stage application of International No. PCT/KR2011/005184, filed Jul. 14, 2011. All disclosures of the document(s) named above are incorporated herein by reference.

BACKGROUND OF THE INVENTION

1. Field of the Invention

The present invention relates to an apparatus for manufacturing a hybrid stabilizer link and, more particularly, to an apparatus for manufacturing a hybrid stabilizer link, capable of manufacturing the hybrid stabilizer link with various standards by adjusting an angle between ball joints and a full length of a shaft when a stabilizer whose opposite ends have a ball joint socket formed of a resin is manufactured.

2. Description of the Related Art

Hybrid stabilizer links in which a metal and a resin are mixed for the purpose of performance improvement and cost reduction have recently been applied to vehicles. The hybrid stabilizer links are configured so that sockets fixing ball studs to opposite ends of a shaft formed of a metal are formed of a resin. The resin sockets are molded in a state in which the shaft and each ball stud are partly inserted into a die.

However, the stabilizer links in which a length of the shaft and an axial angle of the ball stud are various according to a type of the applied vehicle are required. New dies should be manufactured to cope with such various lengths of the shaft and such various angles of the ball stud, and costs required to manufacture the dies are increased.

SUMMARY OF THE INVENTION

The present invention is directed to providing an apparatus for manufacturing a hybrid stabilizer link capable of adjusting an angle and a length when a resin socket is formed at one end of the hybrid stabilizer link, and then another socket is formed at the other end of the hybrid stabilizer link.

According to an aspect of the present invention, there is provided an apparatus for manufacturing a hybrid stabilizer link, which includes: a die that injects a resin to mold a socket into which a ball stud is inserted; a shaft whose first end is inserted into the die and which has the socket formed at the inserted first end thereof; and a control unit that fixes a premolded socket to the second end of the shaft, adjusts a rotational angle of the shaft based on a lengthwise axis of the shaft, and adjusts a distance from the die.

According to the apparatus for manufacturing a hybrid stabilizer link configured as described above, after the socket is injection-molded on the first end of the metal shaft having a predetermined length, when another socket is injection-molded on the second end of the shaft, an angle of the previously molded and a distance from the die are easily adjusted. Thereby, the hybrid stabilizer links having various distances and angles between ball studs can be manufactured using one die. Thus, it is possible to cut costs, and remove inconvenience that a new die should be prepared whenever standards of the hybrid stabilizer link are changed.

Additional aspects and/or advantages of the invention will be set forth in part in the description which follows and, in part, will be obvious from the description, or may be learned by practice of the invention.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF THE EXEMPLARY EMBODIMENTS

Hereinafter, an apparatus for manufacturing a hybrid stabilizer link according to an exemplary embodiment of the present invention will be described in detail with reference to the accompanying drawings.

Figure 1:
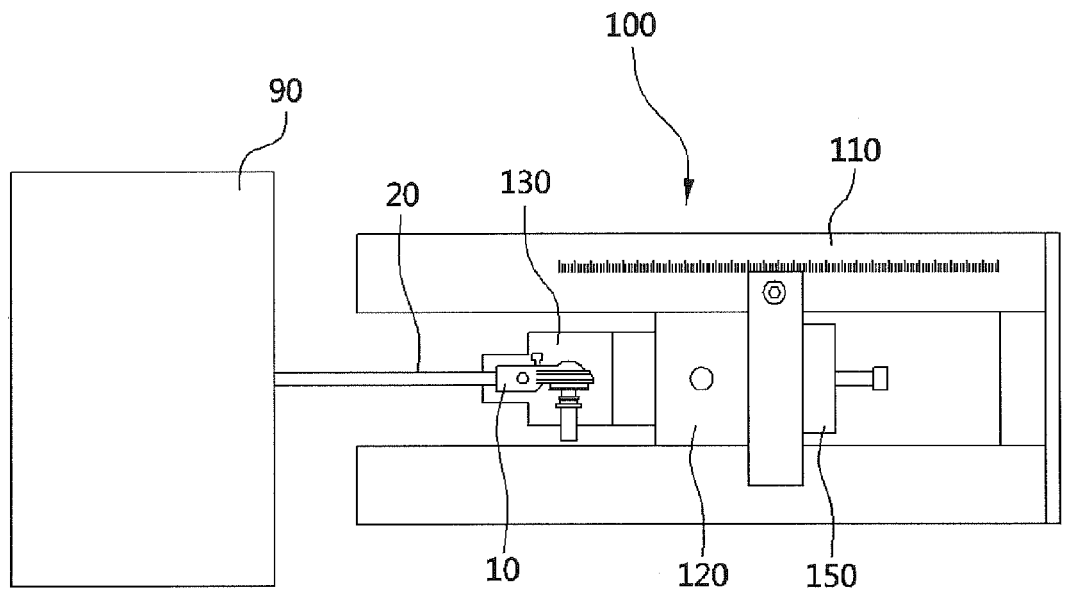
FIG. 1 is a configuration diagram showing an apparatus for manufacturing a hybrid stabilizer link according to an exemplary embodiment of the present invention.
Figure 2:
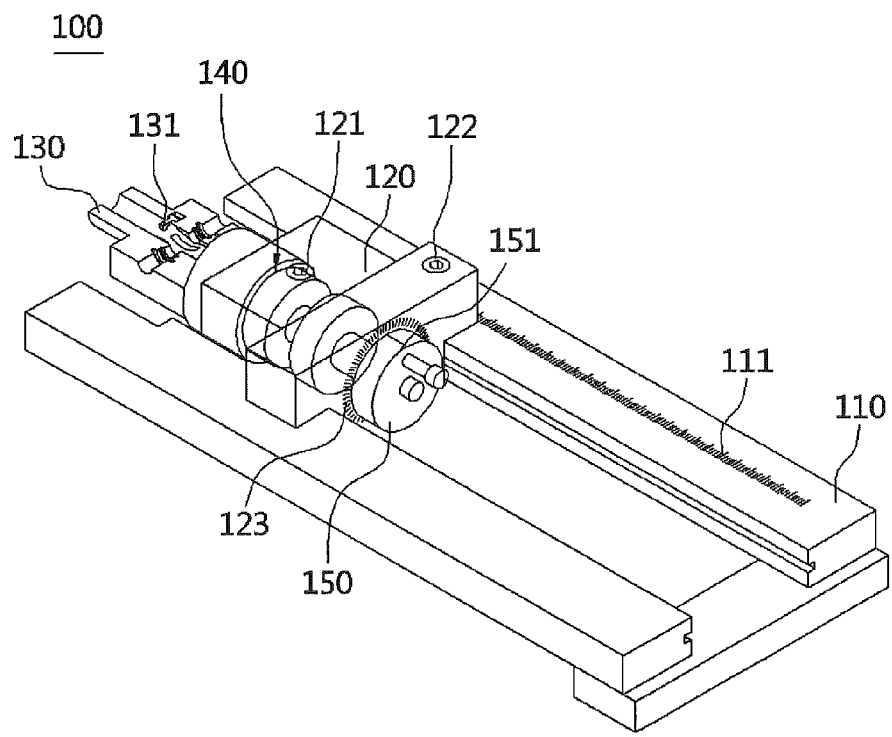
FIG. 2 is a detailed configuration diagram showing a control unit shown in FIG. 1.

FIG. 1 is a configuration diagram showing an apparatus for manufacturing a hybrid stabilizer link according to an exemplary embodiment of the present invention, and FIG. 2 is a detailed configuration diagram showing a control unit shown in FIG. 1.

Referring to FIGS. 1 and 2, an apparatus for manufacturing a hybrid stabilizer link according to an exemplary embodiment of the present invention includes a shaft 20, at a first end of which a first socket 10 is formed, a die 90 into which the second end of the shaft 20 is inserted in order to form a second socket (not shown) at the second end of the shaft 20, and a control unit 100 that fixes the first socket 10, is rotatable around a lengthwise axis of the shaft 20, and is allowed to adjust a distance between the shaft 20 and the die 90.

The control unit 100 includes a guide frame 110, a movable body 120 that is movable along the guide frame 110 and can adjust a linear distance from the die 90, a jig 130 that fixes the first socket 10 of the shaft 20 in the vicinity of the movable body 120 which is directed to the die 90, a rotator 140 that rotatably passes through the movable body 120 and fixes a first end of the jig 130, and a rotating handle 150 that is coupled to a first end of the rotator so as to rotate the rotator 140 and can adjust a rotational angle.

Hereinafter, a configuration and operation of the hybrid stabilizer link manufacturing apparatus configured as described above in accordance with the exemplary embodiment of the present invention will be described in greater detail.

First, the shaft 20 formed of a metal is prepared. Here, a length of the metal shaft 20 is determined according to a type of an applied vehicle. The first end of the metal shaft 20 is inserted into the die 90, and the first socket 10 fixed to the first end of the metal shaft 20 by injection molding of a resin.

In this process of forming the first socket 10, a ball stud 11 may be inserted into the die 90 together.

Further, a method of forming the first socket 10 first and then inserting the ball stud 11 and a method of inserting a seat and the ball stud 11 into the die and performing the injection molding may be used.

The shaft 20, at the first end of which the first socket 10 is formed or has the ball stud 11 fixed rotatably, has no angular orientation. Such angular orientation is determined by a second socket to be formed at the second end of the shaft and a ball stud fixed to the second socket.

In this way, the shaft 20, at the first end of which the first socket 10 is at least formed, is fixed to the jig 130.

Figure 3:
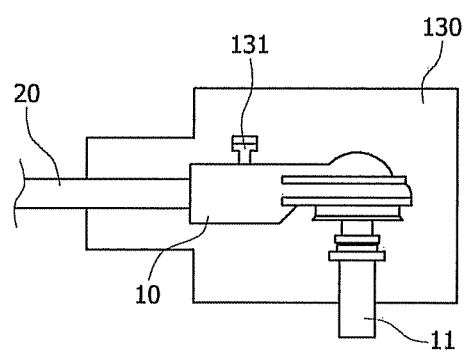
FIG. 3 is a detailed configuration diagram showing a jig shown in FIG. 2 and a first socket fixed to the jig.

FIG. 3 is a detailed configuration diagram showing the jig 130 and the first socket 10 fixed to the jig 130.

Referring to FIG. 3, the jig 130 has a recess 131 in which the first socket 10 and the ball stud 11 rotatably coupled to the first socket 10 are placed, and a catch 132 that fixes the first socket 10 and the ball stud 11 so as to prevent the first socket 10 and the ball stud 11 from moving in the recess 131.

The catch 132 is configured to apply a predetermined pressure to the inserted first socket 10 using an elastic member. However, any member may be used as long as it can prevent movement of the inserted first socket 10.

The jig 130 configured in this way is fixed to the first end of the rotator 140 rotatably passing through the movable body 120, and is rotated along with the rotator 140.

Figure 4:
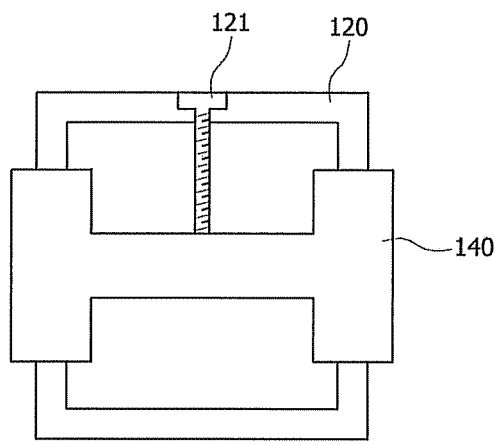
FIG. 4 is a cross-sectional configuration diagram showing a coupled relation of a movable body and a rotator.

FIG. 4 is a cross-sectional configuration diagram showing a coupled relation of the movable body and the rotator.

Referring to FIG. 4, the movable body 120 is a hollow body, and the rotator 140 passes through opposite faces of the movable body 120.

The rotator 140 is required to be fixed in a predetermined rotated state. A first stopper 121 is bolted to the movable body 120, comes into contact with a part of the rotator 140, and fixes the rotator 140 by friction.

The rotator 140 is coupled to the movable body 120 via a bearing. Alternatively, the rotator 140 may be rotatably installed by a lubricant.

The rotating handle 150 capable of rotating the rotator 140 by hand is coupled to the second end of the rotator 140. Thus, a worker rotates the rotating handle 150 so as to be able to turn the jig 130 located on the opposite side of the movable body 120.

Figure 5:
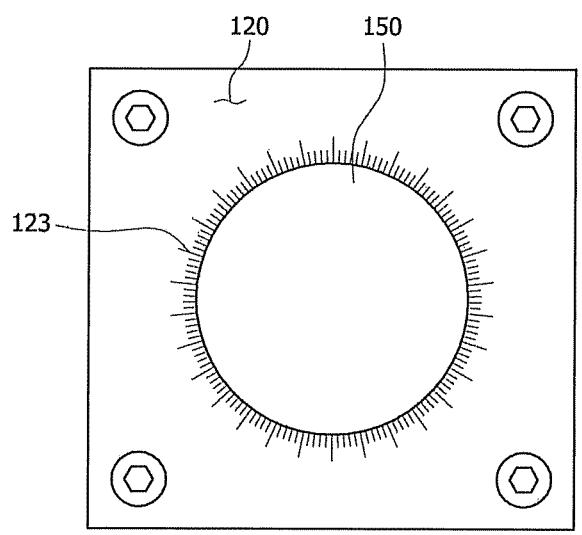
FIG. 5 is a top-down configuration diagram of a rotating handle and one face of the movable body.

FIG. 5 is a top-down configuration diagram of the rotating handle and one face of the movable body.

Referring to FIG. 5, the rotating handle 150 is coupled to the rotator 140, and is exposed from one face of the movable body 120. The movable body 120 bears angle graduations 123 marked along a circumference of the rotating handle 150, and the rotating handle 150 is provided with an index line 151.

Therefore, a worker checks a position of the index line 151 while rotating the rotating handle 150, so that the worker can accurately rotate the rotating handle 150 at a desired angle.

When the rotating handle 150, the rotator 140, and the jig 130 are rotated in this way, the shaft 20 fixed to the jig 130 is rotated at a predetermined angle. This rotation is to adjust angles of the ball stud 11 fixed to the first socket 10, the second socket provided for the second end of the shaft 20, and the ball stud fixed to the second socket. Accordingly, it is possible to manufacture hybrid stabilizer links having various angular orientations using a single die.

Further, the movable body 120 is movable linearly along the guide frame 110.

The guide frame 110 is a linear motion guide. The guide frame 110 may be applied regardless of its shape as long as the movable body 120 can move linearly in a fixed state.

The movable body 120 moving linearly along the guide frame 110 adjusts a distance between the jig 130 and the die 90. As described above, the movable body 120 is configured so that the second end of the shaft 20 can be inserted into the stationary die 90 with the first end of the shaft 20 fixed to the jig 130 so as to correspond to the length of the shaft 20 which is determined according to the type of the vehicle.

The guide frame 110 bears distance graduations 111 marked in units of millimeters so as to enable a work to check a movement distance. The worker can move the movable body 120 to a position corresponding to the length of the shaft 20, and control the second socket coupled to the second end of the shaft 20 to be injection-molded in the die 90.

The movable body 120 is provided with a second stopper 122 that applies a pressure to the guide frame 110 in a positioned state and prevents a change in position of the movable body 120.

While the exemplary embodiment of the present invention has been shown and described, it will be understood by those skilled in the art that various changes in form and details may be made therein without departing from the spirit and scope of the invention as defined by the appended claims.

The present invention can manufacture the hybrid stabilizer link by variously adjusting the angles of the opposite ball joints.

What is claimed is:

1. An apparatus for manufacturing a hybrid stabilizer link, comprising:
    a die that injects a resin to mold a socket into which a ball stud is inserted;
    a shaft whose first end is inserted into the die and which has the socket formed at the inserted first end thereof; and
    a control unit that fixes a pre-molded socket to the second end of the shaft, adjusts a rotational angle of the shaft based on a lengthwise axis of the shaft, and adjusts a distance from the die;
    wherein the control unit includes:
        a guide frame that is spaced apart from the die by a predetermined distance in a fixed state;
        a movable body that linearly moves toward or away from the die along the guide frame;
        a rotator that passes through the movable body, and is rotatably coupled to the movable body;
        a jig that is fixed to one face of the rotator which faces the die, and fixes the pre-molded socket to the second end of the shaft; and
        a rotating handle that is fixed to the other face of the rotator which is located on the opposite side of the jig, and rotates the rotator and the jig.

2. The apparatus of claim 1, wherein the movable body includes:
    angle graduations marked along a circumference of the rotating handle;
    a first stopper that applies a pressure to the rotator so as to prevent movement of the rotator; and
    a second stopper that applies a pressure to the guide frame so as to prevent linear motion along the guide frame.

3. The apparatus of claim 1, wherein the guide frame further includes distance graduations for checking a movement distance of the movable body.

4. The apparatus of claim 2, wherein the guide frame further includes distance graduations for checking a movement distance of the movable body.

* * * * *